United States Patent Office 3,182,255
Patented May 4, 1965

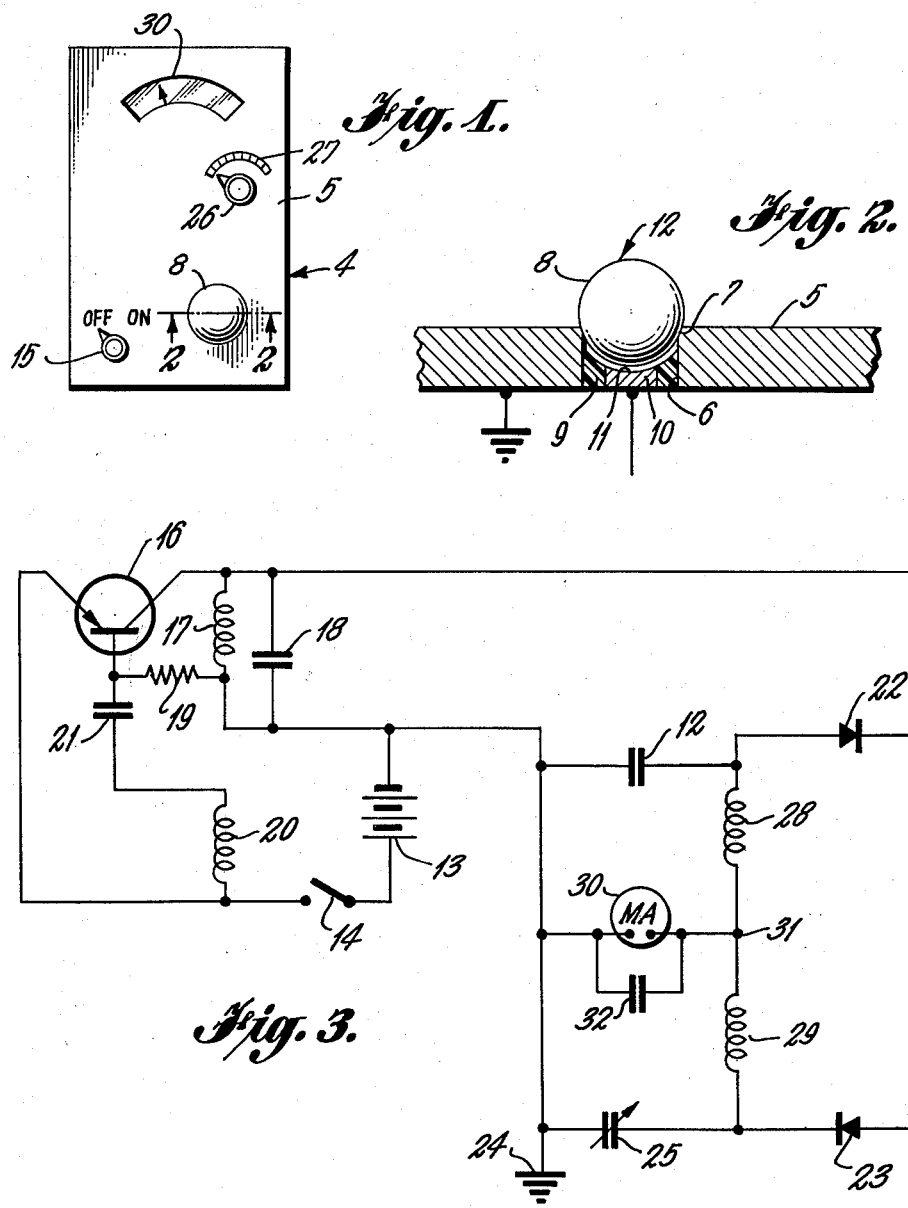

3,182,255
INSTRUMENT FOR CAPACITIVELY TESTING THE CONDITION OF LUBRICATING OIL
Evan L. Hopkins and Lee K. Irwin, Emporia, Kans., assignors to Hopkins Manufacturing Corporation, Emporia, Kans., a corporation of Kansas
Filed Feb. 11, 1960, Ser. No. 8,065
4 Claims. (Cl. 324—61)

The present invention relates to an instrument for testing the condition of oil such as lubricating oil. The invention also relates to a novel bridge circuit for measuring capacitance.

It has heretofore been known that the extent of harmful contamination and other qualities of lubricating oil can be ascertained by determining the dielectric property of the oil. Unused lubricating oils of good quality have dielectric constants which are similar, irrespective of their viscosities or the types of detergents or other additives incorporated in the oils. The accumulation of suspended foreign matter in the oils and the breakdown of their protective film forming ability alter their dielectric constants. These known facts are utilized in the instrument of the present invention.

The invention may be briefly described as including a novel type of capacitor in which one of the plates is a metallic member having a convex portion which is supported by the rim of an opening in a metallic plate. The second plate of the capacitor is an insert which is recessed within this opening and is separated from the walls of the opening by a ring of dielectric material. The surface of the insert is concave and is adapted to receive a sample consisting of a few drops of the oil to be tested. The convex surface of the first plate is supported near the concave surface of the insert or second plate. The two plates thus cooperate to provide a capacitor in which the sample of the oil to be tested is the dielectric. A novel electric circuit is provided for indicating the capacitance of this capacitor. The electric circuit preferably includes a radio frequency oscillator which supplies power to a bridge circuit through a pair of diodes. The capacitor described above is positioned in one leg of the novel bridge circuit and an adjustable second capacitor is positioned in another leg of the bridge circuit. An indication of the capacitance of the adjustable second capacitor required to balance the bridge circuit gives an indication of the dielectric strength of the oil sample being tested.

One of the primary objects of the invention is to provide an inexpensive instrument for quickly testing with extreme accuracy the condition of lubricating oil.

Another object of the invention is to provide an instrument which is capable of testing the condition of lubricating oil by use of a sample consisting of only a few drops of the oil. The sample can usually be obtained by permitting a few drops to drain from the dip stick of the engine containing the oil to be tested.

A further object of the invention is to provide a novel bridge circuit for measuring capacitance with extreme accuracy.

Other objects and advantages are pointed out in the following description which has reference to the accompanying drawing wherein:

FIGURE 1 is a top plan view of an instrument embodying the invention;

FIGURE 2 is an enlarged sectional view taken in the direction of the arrows along the line 2—2 of FIGURE 1; and FIGURE 3 is a diagram of the electric circuit utilized in the instrument.

A housing is designated generally by the reference numeral 4 and is provided with a metallic cover plate 5. The cover plate 5 has a circular opening 6 therein. The rim 7 of the opening 6 is preferably slightly beveled as shown in FIGURE 2. A metallic sphere 8 has a diameter slightly greater than the diameter of the opening 6 and rests on the beveled rim 7 of that opening. A ring 9 of material such as nylon, styrene, or other material having good dielectric properties is positioned within the opening 6. A metallic insert 10 is supported by the ring 9 and is centrally positioned within the opening 6. The upper end 11 of the insert 10 and the upper end of the ring 9 are spherically concave as shown in the drawing and have a radius of curvature slightly greater than the radius of the sphere 8. A few drops of oil may be placed on the concave upper end 11 of the insert 10 after removing the sphere 8. The sphere 8 may then be replaced in the concavity. A film of oil will be formed between the insert 10 and the sphere 8. This film of oil forms the dielectric of a capacitor in which the adjacent surfaces of the sphere 8 and insert 10 form the plates. The beveled edges 7 of the opening 6 accurately position the sphere relative to the end 11 of the insert 10 and there is thus formed an oil film of fixed thickness. The only variable in the capacitance of the capacitor thus formed will be the dielectric properties of the oils being tested. This capacitor is designated generally by the reference numeral 12.

The electric circuit includes a battery 13 which is connected in a feed-back oscillator circuit by means of a switch 14 controlled by a knob 15 (FIGURE 1). The battery 13 biases the base of a transistor 16 which is connected as a common emitter current and voltage amplifier. A coil 17 and a capacitor 18 form a parallel tuned circuit which is resonant at a radio frequency which may be in the order of 4.5 megacycles. A resistor 19 biases the base of the transistor 16. A coil 20 is inductively coupled to the coil 17 and its output is fed to the base of the transistor 16 through a capacitor 21.

The oscillator circuit described above is more or less conventional. One terminal of its output is fed to diodes 22 and 23 which are oppositely connected, as shown in the drawing. The other output terminal of the oscillator is grounded at 24. The capacitor 12 has one of its plates (8) connected to ground at 24 and its other plate (10) connected to the diode 22. An adjustable capacitor 25 is provided with a control knob 26 (FIGURE 1) associated with a suitably calibrated dial 27. The adjustable capacitor 25 is connected to the diode 23 and to ground. Radio frequency choke coils 28 and 29 are connected between diodes 22 and 23. A micro-ampere meter 30 is connected to ground and to terminal 31 between choke coils 28 and 29. The meter 30 is shunted by a capacitor 32, which is sufficiently large to prevent the meter from responding to individual half cycles of the applied current and causes the meter to average out the entire cycle of the applied current. The capacitor 32 also shunts the meter coil to insure that the meter movement will not be resonant at the applied frequency. The capacitor 32 may be eliminated if the meter 30 has a sufficiently long time constant. The needle of the meter 30 will deflect in one direction or the other depending on which of the half cycles of applied current is the larger.

The diode 23 is conductive on the positive half of the cycle of the output of the oscillator circuit and charges the capacitor 25. Choke coil 29 conducts current to the terminal 31 and the meter 30, which tends to deflect the meter needle in one direction. The diode 22 is conductive on the negative half of the cycle and charges the capacitor 12. In this half cycle, choke coil 28 conducts current to the terminal 31 and to the meter 30 which tends to deflect the meter needle in the opposite direction. However, when the bridge is balanced by proper adjustment of the capacitor 25, the current from diode 22 and capacitor 12 are equal and opposite to the current from diode 23 and capacitor 25 and the average potential at terminal 31 is zero so no current actually flows through the meter 30. When the bridge is unbalanced, the choke coils 28 and 29 and the capacitor 32 function to smooth out the pulses and cause smooth flow of current through the meter 30.

The calibration of the instrument may be checked by placing a sample of new oil of known quality in the capacitor 12 and adjusting the capacitor 25 until the meter 30 indicates no flow of current therethrough. This adjustment of the capacitor 25 should result in a "good" reading on the dial 27. Oil which has been contaminated through use will have a different dielectric strength and, when such oil is tested, a different adjustment of the capacitor 25 will be required to avoid flow of current through the meter 30. The reading on the dial 27 will be "poor" or "bad," depending on the extent to which the dielectric strength of the lubricating oil has changed.

The novel form of the capacitor 12 illustrated in FIGURE 2 utilizes as its dielectric films of oil of uniform thickness so that the only variable is the dielectric strength of the oil. The bridge circuit is highly sensitive to minor variations in the dielectric strength of the oil being tested.

The following identities and values of components of the circuit are given as examples only and not by way of limitation:

| | |
|---|---|
| Battery 13 | 9 volts. |
| Transistor 16 | 2N139. |
| Capacitor 18 | 20 mmf. |
| Resistor 19 | 100,000 ohms. |
| Capacitor 21 | 500 mmf. |
| Diode 22 | 1N34a. |
| Diode 23 | 1N34a. |
| Capacitor 25 | Variable 3 to 25 mmf. |
| Choke coil 28 | 1 mh. |
| Choke coil 29 | 1 mh. |
| Meter 30 | 0 to 50 microamperes (internal resistance of 2,200 ohms). |
| Capacitor 32 | .01 mf. |

We have illustrated and described what we now consider to be the preferred embodiment of our invention. It will be understood that various alterations and modifications may be adopted without departing from the broader scope of the invention defined by the claims.

Having thus described our invention, we claim:

1. An instrument for testing the condition of oil by indicating its dielectric property comprising a metallic plate having a circular opening therein, a metallic sphere having a diameter greater than the diameter of said opening, a metallic insert having a spherically concave surface portion centrally positioned in said opening, a ring of dielectric material positioned between said insert and the walls of said opening, said insert and said ring being recessed within said opening to provide a receptacle for a sample of lubricating oil to be tested, said sphere resting on the rim of said opening and being accurately spaced from said concave surface portion of said insert to form with said insert a capacitor having the oil sample as the dielectric, and an electric circuit means including said sphere and said insert for indicating the capacitance of said capacitor.

2. An instrument for indicating the condition of lubricating oil by indicating its dielectric strength comprising a supporting plate having a circular opening therein, a ring of dielectirc material secured to the walls of said opening, a metallic insert supported within said ring and centrally positioned in said opening, the upper surface of said insert being spherically concave and positioned below the rim of said opening for reception of a sample of oil to be tested, a metallic sphere having a diameter greater than the diameter of said opening, said sphere resting on the rim of said opening and being slightly spaced from the concave upper end of said insert, said concave surface of said insert and the surface of said sphere providing the plates of a capacitor in which a film of the oil sample is the dielectric, and an electric circuit means including said insert and said sphere for indicating the capacity of said capacitor.

3. An instrument for testing the condition of oil by indicating an electric property comprising a conductive plate having a circular opening therein, a conductive sphere having a diameter greater than the diameter of said opening, a conductive insert having a spherically concave surface portion centrally positioned in said opening, a ring of insulating material joining said insert to the walls of said opening with a fluid retaining seal, said insert and said ring being recessed within said opening to provide a receptacle for a sample of lubricating oil to be tested, said sphere resting on the rim of said opening and being accurately spaced from said concave surface portion of said insert to form an electrical cell for retaining a predetermined body of oil as an intermediate member, and an electric circuit means including said insert and said sphere for indicating an electrical parameter dependent upon the electrical characteristics of such an oil body.

4. An instrument for testing the condition of a fluid by indicating an electrical characteristic thereof comprising a support having an opening therein, electrical insulating means secured to the walls of said opening, an electrically conductive insert supported within said insulating means and having a spherically concave surface portion forming a receptacle for a sample of fluid to be tested, an electrically conductive sphere, mounting means disposed on said support about and immediately adjacent to said opening, the diameter of said mounting means being less than the diameter of said sphere, said sphere being removably directly engageable with said mounting means to locate the surface of said sphere in a predetermined position opposite and slightly spaced from said spherically concave surface portion of said insert to form an electrical cell for retaining a predetermined sample of fluid therebetween, and an electrical circuit means including said insert and said sphere for indicating an electrical parameter dependent upon the electrical characteristics of such a sample of fluid.

References Cited by the Examiner

UNITED STATES PATENTS

| | | | |
|---|---|---|---|
| 1,686,365 | 10/28 | Becker | 324—65 X |
| 1,779,907 | 10/30 | Dye | 324—65 X |
| 2,337,414 | 12/43 | Rieber | 324—65 X |
| 2,553,754 | 5/51 | Dietert et al. | 324—65 |
| 2,752,566 | 6/56 | Quinton | 324—65 |
| 2,759,147 | 8/56 | Stein | 324—61 |
| 2,766,428 | 10/56 | Sippach | 324—61 |
| 2,849,675 | 8/58 | Hall et al. | 324—61 |
| 3,002,150 | 9/61 | Batteau | 324—61 |
| 3,012,193 | 12/61 | Breen | 324—61 |

OTHER REFERENCES

A Simple, Small Dielectric Test Cell for Liquids, Baxter et al., Journal of Scientific Instruments, vol. 33, August 1956, pages 315–316.

WALTER L. CARLSON, *Primary Examiner.*

LLOYD McCOLLUM, SAMUEL BERNSTEIN,
*Examiners.*